US010052810B2

(12) United States Patent
Spagnoli et al.

(10) Patent No.: US 10,052,810 B2
(45) Date of Patent: Aug. 21, 2018

(54) BLOW MOLD ASSEMBLY

(71) Applicant: Milacron LLC, Cincinnati, OH (US)

(72) Inventors: Robert Anthony Spagnoli, Cement City, MI (US); Robert L. Padley, Brooklyn, MI (US); Christopher Brian Isaac, Tecumseh, MI (US)

(73) Assignee: MILACRON LLC, Cincinnati, OH (US)

( * ) Notice: Subject to any disclaimer, the term of this patent is extended or adjusted under 35 U.S.C. 154(b) by 0 days.

(21) Appl. No.: 15/631,578

(22) Filed: Jun. 23, 2017

(65) Prior Publication Data
US 2017/0282437 A1 Oct. 5, 2017

Related U.S. Application Data

(63) Continuation-in-part of application No. 14/874,494, filed on Oct. 5, 2015, now Pat. No. 9,688,012.

(51) Int. Cl.
| B29C 49/48 | (2006.01) |
| B29C 49/50 | (2006.01) |
| B29L 31/00 | (2006.01) |
| B29C 49/04 | (2006.01) |
| B29C 49/56 | (2006.01) |

(52) U.S. Cl.
CPC .......... B29C 49/4802 (2013.01); B29C 49/48 (2013.01); B29C 49/482 (2013.01); B29C 49/4817 (2013.01); B29C 49/04 (2013.01); B29C 2049/4861 (2013.01); B29C 2049/563 (2013.01); B29L 2031/712 (2013.01); B29L 2031/7158 (2013.01); B29L 2031/7172 (2013.01)

(58) Field of Classification Search
CPC . B29C 49/48; B29C 49/4802; B29C 49/4817; B29C 2049/4861; B29C 49/50
See application file for complete search history.

(56) References Cited

U.S. PATENT DOCUMENTS

| 4,032,278 A | 6/1977 | Kuenzig et al. |
| 5,894,024 A | 4/1999 | Lambarth et al. |
| (Continued) | | |

OTHER PUBLICATIONS

International Search Report and Written Opinion for PCT/US2016/055295, dated Nov. 3, 2016.

Primary Examiner — Robert B Davis
(74) Attorney, Agent, or Firm — Medler Ferro Woodhouse & Mills PLLC

(57) ABSTRACT

A blow mold assembly is disclosed having removable neck insert mold components for forming features of a container for engaging a removable container closure and manually operable retention devices for releasably retaining the neck insert mold components with mating mold components of the mold assembly. Advantageously, each manually operable retention device includes a clamp mechanism movable between a release position and a clamp position by manual operation and the clamp mechanism is effective to resist forces acting on the clamp to move the clamp to a release position when the clamp is in the clamp position. Each manually operable retention device is retained with an associated mating mold component when a neck insert mold component is removed from or installed to the mold assembly.

15 Claims, 6 Drawing Sheets

(56) References Cited

U.S. PATENT DOCUMENTS

| | | | |
|---|---|---|---|
| 5,968,560 A | * | 10/1999 | Briere .................. B29C 33/305 |
| | | | 249/102 |
| 6,648,623 B2 | | 11/2003 | Petre |
| 6,966,764 B2 | | 11/2005 | Wohlgemuth |
| 7,335,007 B2 | | 2/2008 | Perez et al. |
| 7,713,055 B2 | | 5/2010 | Janeczek |
| 8,770,961 B2 | | 7/2014 | Duclos |
| 2014/0017353 A1 | | 1/2014 | Zoppas et al. |

* cited by examiner

BLOW MOLD ASSEMBLY

CROSS-REFERENCE TO RELATED APPLICATIONS

The present application is a continuation-in-part of U.S. patent application Ser. No. 14/874,494 filed Oct. 5, 2015, now U.S. Pat. No. 9,688,012, the content of which is incorporated by reference herein in its entirety.

FIELD OF THE INVENTION

This invention relates generally to blow molded containers. More particular, this invention relates to mold assemblies wherein the so-called "neck finish" (surface feature for engaging a container closure) is formed in the blow molding process.

BACKGROUND OF THE INVENTION

Blow molding is a cyclic process wherein a hollow tubular preform of material in a moldable condition is centered on the parting plane of a mold assembly, the mold assembly is closed around the preform, the preform is expanded so the exterior of the preform abuts molding surfaces defined by the closed mold assembly, the blow molded article is conditioned to be sufficiently rigid to retain its size and shape while unsupported, the mold assembly is opened and the blow molded article is removed. In general, the moldable condition of the preform is achieved when the material of the preform is at an elevated temperature, and the rigid condition of the blow molded article is achieved when the temperature of the material has been reduced. A blow molding machine comprises a press for opening and closing the mold assembly and pressurizing apparatus for introducing a pressurized fluid (typically air) to expand the preform in the closed mold assembly. One type of blow molding equipment produces blow molded containers from tubular extrusions produced by extruding equipment arranged relative to a molding assembly to position one or more extrusions in the parting plane of the mold assembly. A substantially tubular extrusion extends below the lower end of a cavity defined by mating mold members and, with abutment of the mating mold members, the lower extremity of the extrusion is closed leaving the upper end of the extrusion open so as to create a blow moldable preform.

Blow molding is commonly used for production of containers for transporting, storing and dispensing liquids, wherein the blow molded article comprises a body portion and a neck connecting the container body with a mouth opening for filling the container and dispensing the contents therefrom. Advantageously, the neck portion of the container comprises an exterior surface having one or more features, referred to herein as the "neck finish", for engaging a separable closure for covering the mouth opening. Known neck finish features include: (i) screw type threads for engaging mating threads on a shank of a closure; and, (ii) at least one protruding circumferential ring, such as a so-called "snap ring" for engaging compatible features in a shank of a closure to resist detachment of the closure from the neck finish. Mold assemblies for blow molding containers comprise mating mold components wherein molding surfaces open to the mating faces of the mold components define the exterior of the container. Advantageously, mold assemblies comprise replaceable insert components for forming the neck portion, wherein the neck insert mold components define the exterior surface of at least the neck finish. Use of replaceable neck insert mold components facilitates production of containers that differ only in the neck finish as well as replacement of inserts that become worn or otherwise degraded through use.

Known constructions of mold assemblies with replaceable neck insert mold components retain those insert components in the mold assemblies with fasteners that require use of tools for removal and installation of the neck insert mold components. Consequently, the time required to replace neck insert mold components is impacted by the time required to remove and install fasteners retaining a neck insert mold component. Under circumstances where container production is interrupted solely for changing from containers accepting one closure type to containers accepting a different closure type, time for replacement of neck finish inserts is a component of lost production time. Hence, there is a need to provide neck insert mold components and retaining devices therefore that reduce the time required for neck insert mold component replacement in mold assemblies.

SUMMARY OF THE INVENTION

Embodiments hereof provide a blow mold assembly for blow molding containers, each container having a neck portion for engaging a removable container closure, the blow mold assembly comprising opposed mating mold components for forming exterior surfaces of at least one container, each mating mold component comprising a removable neck insert mold component for forming closure engaging features on the exterior of a portion of a container neck, and, at least one manually operable retention device for retaining the neck insert mold component with a mating mold component of the blow mold assembly.

Embodiments hereof provide a mold assembly for extrusion blow molding of a container having a neck portion for engaging a removable container closure, the blow mold assembly comprising removable neck insert mold components for forming at least the container closure engaging features of the container neck wherein each removable neck insert mold component comprises a neck finish member for forming, at least in part, the exterior surface of the portion of the container that engages a removable container closure; a shear member for parting a tubular parison so as to define a perform below the shear member; and, the mold assembly comprises at least one manually operable retention device for retaining the neck insert mold component with a mating mold component of the blow mold assembly.

Further objects and advantages shall be made apparent from the accompanying drawings and the following description thereof.

In an embodiment, a blow mold assembly for blow molding a container having a neck portion for engaging a removable container closure includes opposed mating mold components for forming the container wherein each mating mold component comprises a removable neck insert mold component for forming the container closure engaging features of the container neck and at least one manually operable retention device for retaining the neck insert mold component with a mating mold component of the blow mold assembly. The container is blow molded from a preform produced from an extruded tubular parison and each neck insert mold component comprises a shear member for parting the tubular parison to define the perform from the portion of the parison below the shear member, a neck finish member for forming the container closure engaging features on the perform and a plurality of pins for aligning the shear member with the neck finish member.

An embodiment of a manually operable retention device in accordance herewith includes a toggle mechanism having a clamp arm for contacting a neck insert mold component and a lever arm, the clamp arm being rotated between a release position and a clamp position by operation of the lever arm and with the clamp arm in the clamp position, the toggle mechanism effective to resist forces acting on the clamp arm to rotate the clamp arm toward the release position. Alternative embodiments of manually operable retention devices are further presented, capable of translating between clamping and release positions on the neck insert mold. In embodiments hereof, a clamp mechanism may be configured for use on a variety of molds, such as a mold for forming a gallon container or a mold for forming a half-gallon container, each being operable between a position that prevents or allows removal or movement of the neck mold insert. Further, each of the manually operable retention devices are retained within a keyway of the mating mold component when the neck insert mold component is removed or installed.

DETAILED DESCRIPTION OF THE INVENTION

The invention shall be illustrated with reference to a preferred embodiment which shall be described in detail. It is not the intention of applicants that the invention be limited to the preferred embodiment, but rather that the invention shall be defined by the appended claims and all equivalents thereof. As used in this description and the accompanying claims, "manually operable" refers to operation by hand without use of tools. The terms "forward" and "rearward", when used in the following description to refer to a blow mold assembly and components hereof are with respect to a position or direction relative to the mold cavity of the blow mold assembly. Thus, "rearward," "rearmost," and "rearwardly" refer to positions distant from, or in a direction away from the cavity of the blow mold assembly, and the terms "forward" and "forwardly" refer to positions near, or in a direction toward the cavity of the blow mold assembly.

Figure 1:
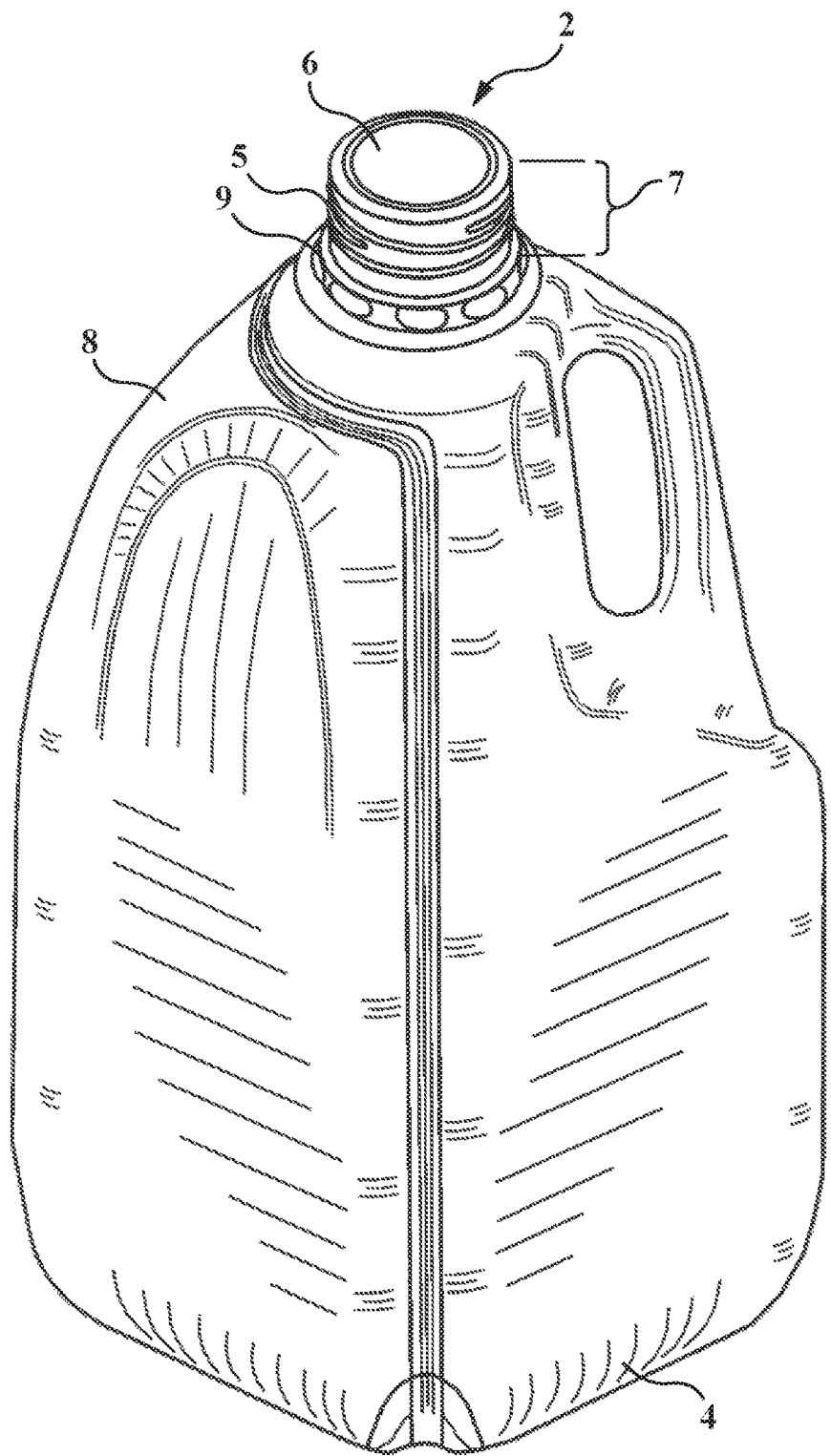
FIG. 1 illustrates a blow molded container with a neck finish.

Referring to FIG. 1, a container 2 comprises a closed end at a base 4 and a mouth opening 6 joined to a hollow body 8 by a neck 7. Neck 7 comprises a neck finish 5, which is shown as a thread flight for engaging a closure (not shown) for covering mouth opening 6. As shown in FIG. 1, a bumper roll 9 is interposed between neck finish 5 and body 8 and serves to improve resistance to deformation of the body 8 in consequence of compressive forces applied vertically to neck 7 when the container is filled and/or a closure is applied.

Figure 2:
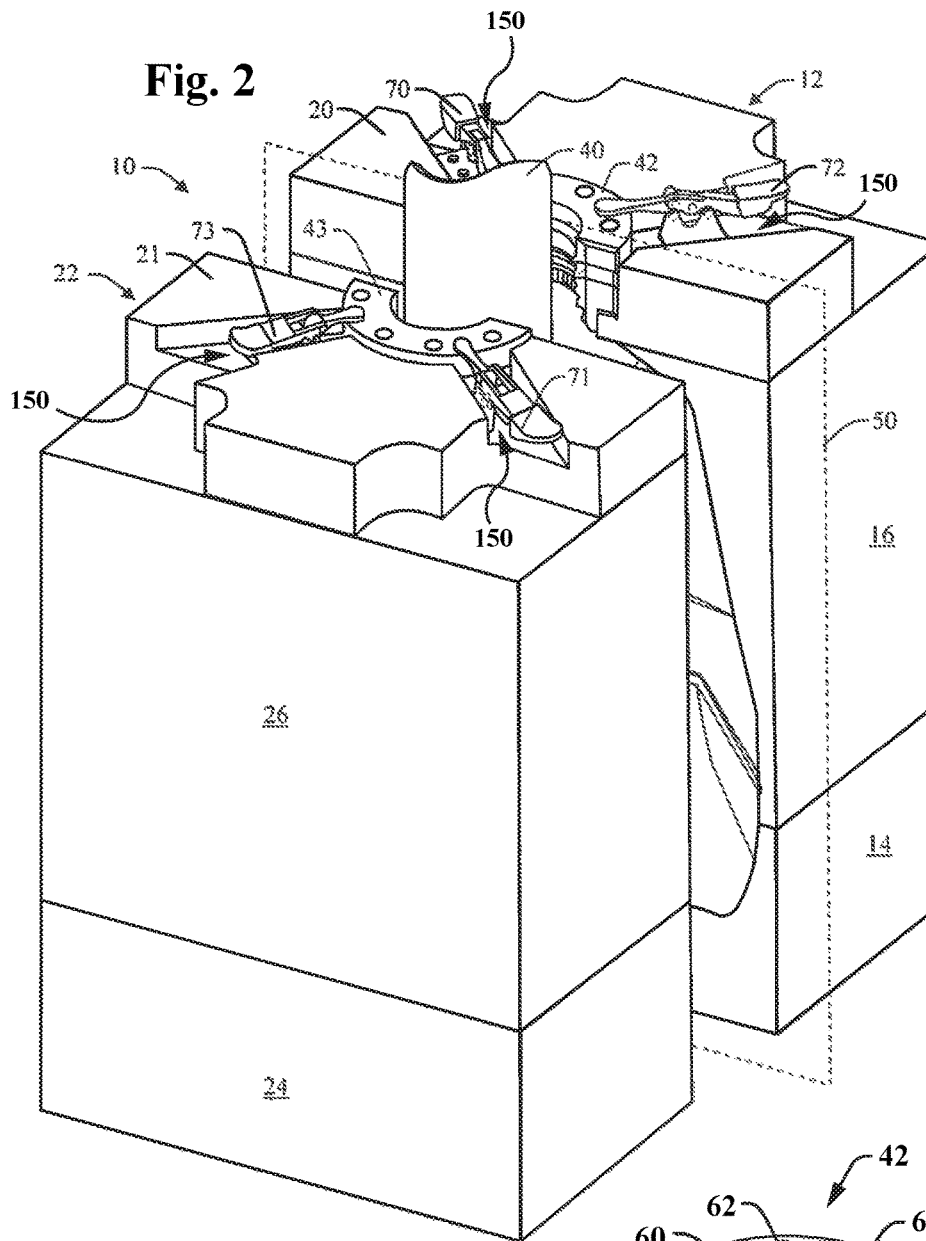
FIG. 2 illustrates a blow mold assembly for blow molding a container such as the container of FIG. 1.

Referring to FIG. 2, a mold assembly 10 comprises opposed mating mold components 12 and 22 each referred to herein as a "mold half", "mating mold half" or "mating mold component". Each of mold components 12 and 22 is carried by a member of a molding machine press (not shown) for translating the mold components between open and closed (clamping and release) positions relative to each other (the open position depicted in FIG. 2). In the open position of FIG. 2, mating mold components 12 and 22 are separated permitting admission of a so-called parison such as a tubular extrusion 40 there between, and permitting removal of a molded article upon completion of a blow molding operation. In a closed position, mating mold components 12 and 22 abut at a parting plane 50, the abutting and opposed faces of mating mold components 12 and 22 having molding surfaces thereon defining at least one cavity for defining the shape and size of an article to be blow molded. Tubular extrusion 40 is formed as a single continuous tubular extrusion and extends below the lowest molding surface of the cavity created with abutment of mating mold components 12 and 22. With mold assembly 10 closed, a blow moldable perform is created by closing the lower end of tubular extrusion 40 while leaving the upper end open for admission of pressurized fluid to expand the preform material to abut the molding surfaces of the cavity.

Figure 4:
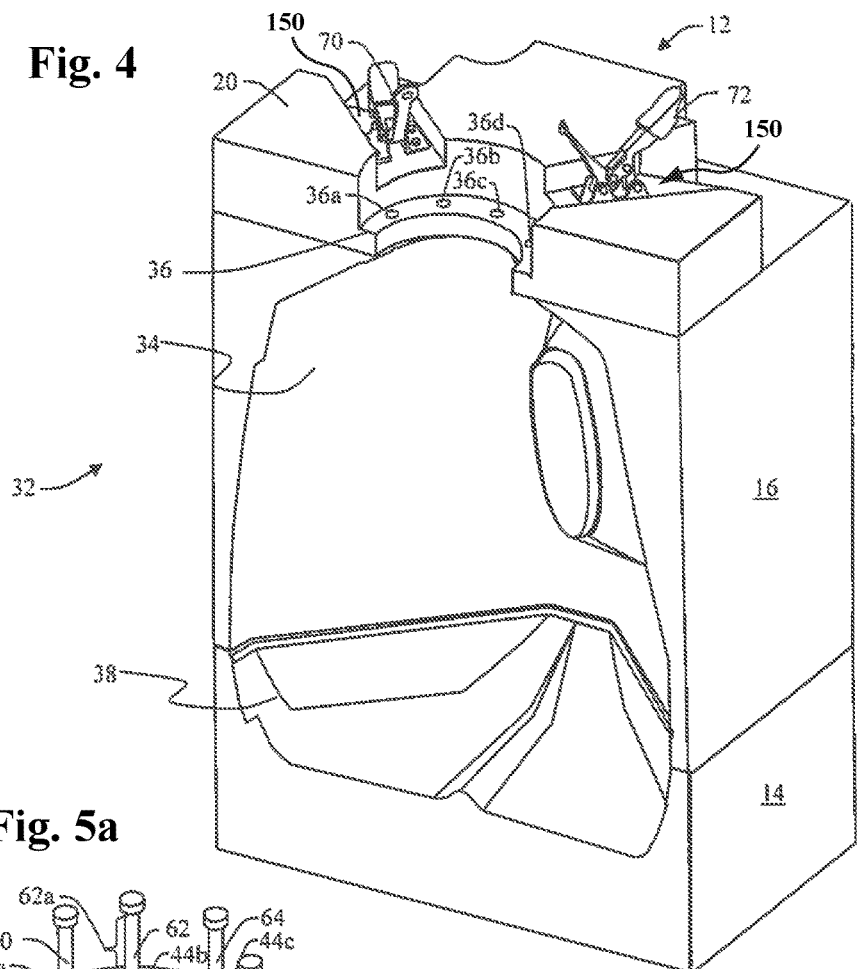
FIG. 4 illustrates a mating mold half of the mold assembly of FIG. 2 with the neck insert mold component removed

Continuing with reference to FIG. 2, each mold half 12 and 22 comprises a neck insert block such as neck insert blocks 20 and 21 for receiving a neck insert mold component such as neck insert mold components 42 and 43. Neck insert mold components 42 and 43 comprise molding surfaces that create closure retention surface features on an exterior of the neck of a container, such as neck 7 of the container 2 of FIG. 1. As seen in FIG. 2, each neck insert mold component 42 and 43 is held in place in its associated neck insert block 20 and 21 by clamping devices such as clamp mechanisms 70, 71, 72 and 73, which are further secured on the neck insert blocks 20 and 21 of the molding assembly 10. More particularly, the molding assembly 10 includes keyways 150 recessed into an upper surface of the neck insert blocks 20 and 21. Each keyway 150 is a support and securement structure for a respective clamp mechanism 70, 71, 72, and 73, as illustrated in FIGS. 2 and 4. The clamp mechanisms 70, 71, 72, and 73 secured within the keyways 150 are described in reference to FIGS. 6, 7a and 7b. Clamp mechanisms 70, 71, 72 and 73 are manually operable between a closed (clamping) condition/position and open (release) condition/position to allow neck insert mold components 42 and 43 to be removed from and installed in neck insert blocks 20 and 21, respectively. FIG. 2 illustrates the closed condition of the manually operable clamp mechanisms 70, 71, 72 and 73. Additional embodiments of clamp mechanisms in accordance herewith are shown in FIGS. 8a and 8b and FIGS. 9a and 9b, which will be described in detail below.

Figure 3:
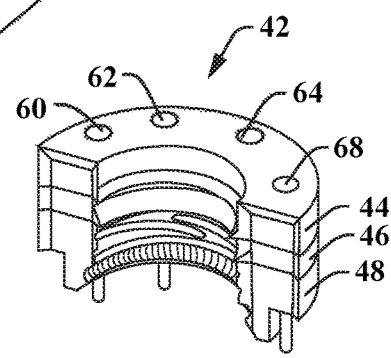
FIG. 3 illustrates a neck insert mold component of the mold assembly of FIG. 2

FIG. 3 illustrates details of a neck insert mold component such as neck insert mold component 42. As is conventional, each neck insert mold component comprises three molding elements: (i) neck insert "master" member 44 effective to seal the interior of perform 40 when a nozzle is inserted in the open end thereof; (ii) sheer member 46; and (iii) neck finish member 48. Shear member 46 is effective to separate the neck 7 from parison 40 on closure of mold assembly 10. The portion of parison 40 that longitudinally extends between shear member 46 and mold base blocks 14 and 24 (FIG. 2) constitutes a blow moldable preform having a closed end formed by abutment of the mold base blocks 14 and 24 and an open end at neck insert mold components 42 and 43. Neck finish member 48 is shown with molding surfaces for forming threads on an exterior of neck 7, which would be used to engage mating threads on an interior of a closure element (not shown). Movement of the neck insert members 44, 46 and 48 of neck insert mold components 42 and 43 relative to each other and relative to neck insert blocks 20 and 21, respectively, is prevented by alignment pins, such as alignment pins 60, 62, 64 and 68 passing through the neck insert members 44, 46 and 48 and into the associated neck insert block such as neck insert block 20. As seen in FIG. 3, recessed areas 44a, 46a, 48a and 44b, 46b and 48b comprise the mold-side face ends of master member 44, shear member 46 and neck finish member 48 to allow room for the relatively large volume of material of parison 40 captured at the neck insert mold components 42 and 43 when mating mold components 12 and 22 are brought into abutment.

Further aspects of mating mold component 12 shall be described with reference to FIG. 4. In FIG. 4, neck insert mold component 42 has been removed and clamp mechanisms 70 and 72 are shown in their "open" or release condition. A step 36 in the face side of neck insert block 20 provides support surfaces for a neck insert mold component such as neck insert mold component 42. Through holes, such as through holes 36a, 36b, 36c and 36d receive the ends of alignment pins 60, 62, 64 and 68, respectively, that project below neck insert mold component 42. With neck insert mold component 42 seated within step 36, alignment pins 60, 62, 64 and 68 prevent horizontal translation and rotation of neck insert mold component 42 relative to neck insert block 20. Mold half 12 comprises a molding surfaces defining portion 32, which may also be referred to as a cavity portion 32, of the mold cavity created by abutment of mating mold components 12 and 22. In addition to the molding surfaces of neck insert mold component 42, cavity portion 32 comprises molding surfaces 34 that define the body of a container, such as body 8 of the container 2 of FIG. 1, and molding surfaces 38 that define the base portion of a container, such as base 4 of the container 2 of FIG. 1. In addition to neck insert block 20, mating mold component 12 comprises a center section 16 comprising molding surfaces 34 and a base block 14 comprising molding surfaces 38. Neck insert block 20 is attached to mold component 12 by fasteners (not shown). The corresponding sections of mating mold component 22 are a center section 26, a base block 24 and the neck insert block 21. Mating mold component 22 comprises molding surfaces substantially mirroring molding surfaces 34 and 38 of mating mold component 12 and neck insert mold component 43 includes elements comprising features including molding surfaces substantially mirroring elements of neck insert mold component 42. With mating mold components 12 and 22 abutting, the molding surfaces of base blocks 14 and 24, center sections 16 and 26, and neck insert mold components 42 and 43 define a complete mold cavity of mold assembly 10.

Figure 5A:
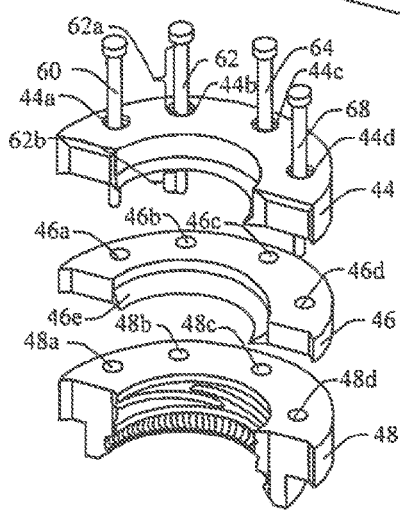
FIGS. 5a and 5b illustrate details of a neck insert mold component and its location in a neck insert block of the mold assembly of FIG. 2
Figure 5B:
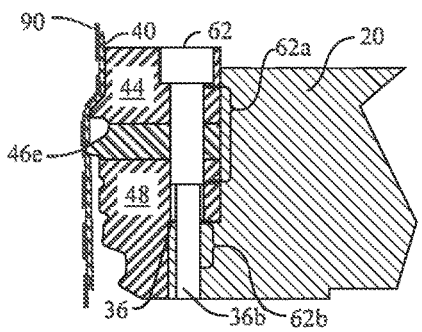

As described with reference to FIG. 3, each neck insert mold component 42 and 43 comprises a neck finish member, such as neck finish member 48, a shear member, such as shear member 46, and a master member, such as master member 44. Stacking and alignment of members of the neck insert mold components, such as neck insert mold component 42, shall be described with reference to FIGS. 5a and 5b. Referring to FIG. 5a, the members of neck insert mold component 42 are shown spaced apart to reveal the through holes of each component. In particular, through holes 44a, 44b, 44c and 44d of neck master member 44 comprise counter-bores and are shown with alignment pins 60, 62, 64 and 68 partially inserted therein. Through holes 46a, 46b, 46c and 46d of shear member 46 are shown spatially or longitudinally in line with through holes of neck master member 44 and through holes 48a, 48b, 48c and 48d are likewise shown spatially or longitudinally in line with through holes of shear member 46. FIG. 5b illustrates a partial cross-sectional view of the members of a neck insert mold component when in place in a neck insert block together with a partial cross-sectional view of a portion of parison 40. As seen in FIG. 5b, the neck insert mold component members, such as neck master member 44, shear member 46 and neck finish member 48, are stacked one atop the other and seated on step 36 of neck insert block 20. As illustrated by alignment pin 62, when seated in the counter-bores of through holes of neck master member 44, the alignment pins project into a through hole of neck insert block 20, such as through hole 36b, but do not extend deep into mold center sections 16 and 26. Alignment of the members of neck insert mold component 42 to one another is effectuated by contact of the sides of spatially in line through holes thereof with the enlarged barrel segments of the associated alignment pins, as illustrated by contact of the sides of through holes 44b, 46b, and 48b with an enlarged barrel segment 62a of alignment pin 62. Alignment of the stack of members of neck insert mold component 42 with neck insert block 20 is effectuated by contact of the end segments of the alignment pin shanks with the sides of through holes of the insert block, as illustrated by contact of end segment 62b of alignment pin 62 with sides of through hole 36b of insert block 20.

Shear member 46 of neck insert mold component 42 is effective, or configured, to part or sever a tubular parison, such as parison 40 of FIG. 2. To that end, shear member 46 includes a circumferential projecting edge 46e. With mating mold components abutted, the circumferential projecting edges of the opposed shear members form a circle of a diameter substantially the same as the outside diameter of a so-called "blow pin" inserted into the open end of parison 40. In FIG. 5b, a profile of a blow pin 90 is illustrated by a dashed line abutting the interior of parison 40. Parison 40 is parted (or severed) by contact between blow pin 90 and the projecting edges of the opposing shear members, such as projecting edges 46e. An enlarged portion of blow pin 90 is effective to force parison 40 against master member 44 so as to seal the portion of parison 40 below master member 44 to allow pressurization of the interior of the perform defined by the portion of parison 40 below shear member 46.

Figure 6:
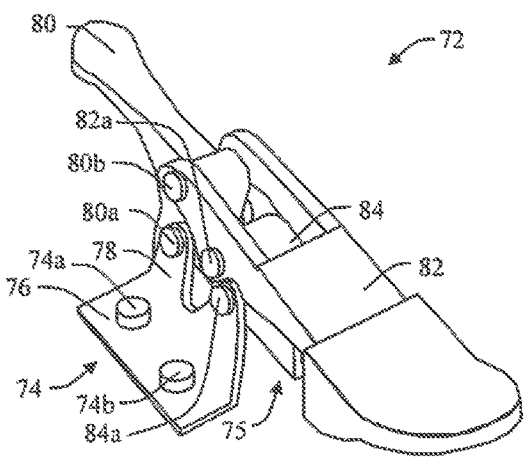
FIG. 6 is a perspective view of a clamp mechanism for retaining a neck insert mold component with the blow mold assembly of FIG. 2 in accordance with an embodiment.

A manually operable retention device, such as clamp mechanism 72, suitable for retaining neck insert mold components 42 and 43 with mold assembly 10 as illustrated in FIG. 2 shall be described with reference to FIGS. 6, 7a and 7b. Clamp mechanism 72 comprises a pair of supports, such as supports 74 and 75, each having a mounting flange, such as mounting flange 76 of support 74, and a support upright, such as support upright 78 of support 74. Mounting flanges of each pair of supports are attached within a corresponding keyway 150 to the associated neck insert block by fasteners, such as fasteners 74a and 74b. A clamp arm, such as clamp arm 80, and a link, such as link 84, are rotatably supported by the support uprights of each pair of supports. A lever arm, such as lever arm 82, is rotatably connected to an end of the link away from the end rotatably supported by the support pair and is rotatably connected to the clamp arm at the end thereof proximate the support pair. A shank of axle 80a passes through the support uprights of the support pair and through a lower end of a rearmost portion of clamp arm 80 permitting rotation of clamp arm 80 relative to the support pair. A shank of axle 84a passes through the support uprights of the support pair and through a rearward end of link 84 (see cross section of FIGS. 7a and 7b) so as to allow rotation of link 84 relative to the support pair. A shank of axle 82a passes through lever arm 82 between its forward and rearward ends and through a forward end of link 84 so as to allow rotation of lever arm 82 relative to link 84. A shank of axle 80b passes through a forward end of lever arm 82 and an upper end of the rearmost portion of clamp arm 80 to allow rotation of clamp arm 80 relative to lever arm 82. The arrangement of clamp arm 80, lever arm 82 and link 84 creates a so-called "toggle mechanism" whereby rotation and translation of lever arm 82 is effective to rotate clamp arm 80. Clamp arm 80 comprises a contact button 80c attached to a forward end of clamp arm 80 for contact with a neck insert mold component. Contact button 80c is positioned to make contact with a top surface of a neck insert mold component when clamp mechanism 72 is in the "clamp" configuration, that is, clamp arm 80 is rotated to the clamp position and a neck insert mold component is in place in neck insert block 20.

Figure 7A:
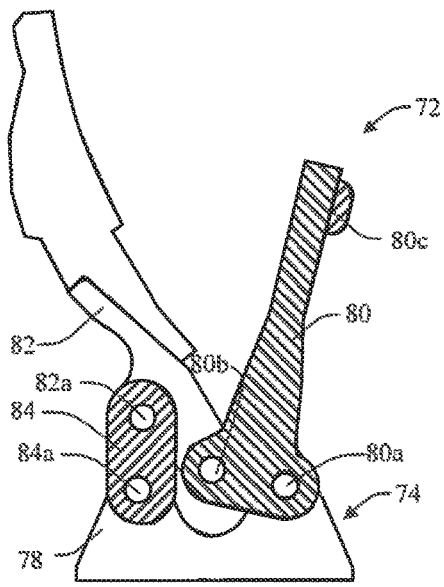
FIGS. 7a and 7b are partial cross-sectional views of the clamp mechanism of FIG. 6 illustrating the release and clamping configurations thereof.
Figure 7B:
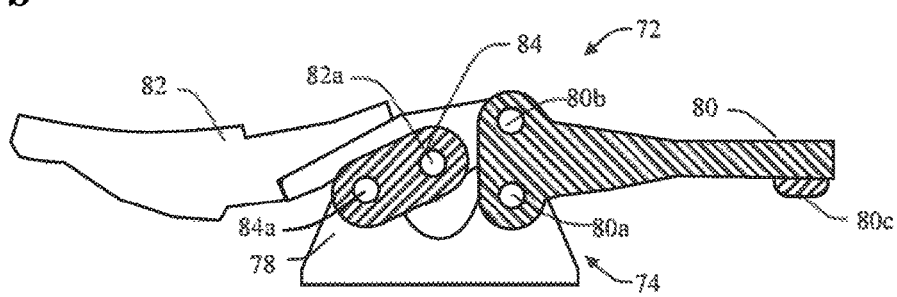

Continuing with reference to FIG. 7a, the release position of clamp arm 80 is illustrated where lever arm 82 is shown rotated to elevate the rearward end thereof and translate lever arm rearwardly (away from axle 80a) relative to the support pair. Rearward translation of lever arm 82 is a consequence of the connection thereof with link 84 and with clamp arm 80 and the rotatable connection of link 84 and clamp arm 80 with supports 74 and 75. As lever arm 82 is rotated towards clamp arm 80, each of link 84 and clamp arm 80 pivot relative to supports 74 and 75 and effect rearward translation of lever arm 82. The clamp position of clamp arm 80 is illustrated in FIG. 7b where lever arm 82 and clamp arm 80 are shown substantially horizontal and link 84 is at its lowest angle of inclination. From the release configuration of FIG. 7a, rotation of lever arm 82 away from clamp arm 80 results in forward translation of lever arm 82 in consequence of connection with link 84 and clamp arm 80. With rotation and translation of lever arm 82 to the position shown in FIG. 7b, clamp arm 80 is rotated to the clamp position. As shown in FIG. 7b, in the clamp configuration lever arm 82 and link 84 are in linear alignment resulting in compression acting along the lengths of link 84 and lever arm 82. In that configuration, force acting on clamp arm 80 at contact button 80c that would tend to rotate clamp arm 80 around axle 80a towards lever arm 82 is resisted by the compressive forces acting on link 84 and lever arm 82. Hence, in the clamp configuration, neck insert mold component 42 is clamped against neck insert block 20 by clamp mechanism 72.

In use, removal and installation of neck mold insert components 42 and 43 is achieved by setting clamp mechanisms 70, 72, 71 and 73 to their release configuration illustrated in FIG. 7a by manual rotation of the associated lever arms towards the associated clamp arms. With the clamp mechanisms in the release configuration, the associated clamp arms are sufficiently vertically disposed so as to allow neck insert mold components 42 and 43 to be removed from or installed into respective neck insert blocks 20 and 21. With neck insert mold components 42 and 43 in place in neck insert blocks 20 and 21, clamp mechanisms 70, 71, 72 and 73 are placed in their clamp configurations by rotating the respective lever arms thereof to be substantially horizontal as shown in FIG. 7b. Clamp mechanisms 70, 71, 72 and 73 are constructed to be configured by application of force solely to the associated lever arms by hand and without resort to tools. By elimination of fasteners as known for securing neck insert mold components, time required to remove and install such mold components is greatly reduced.

Figure 8A:
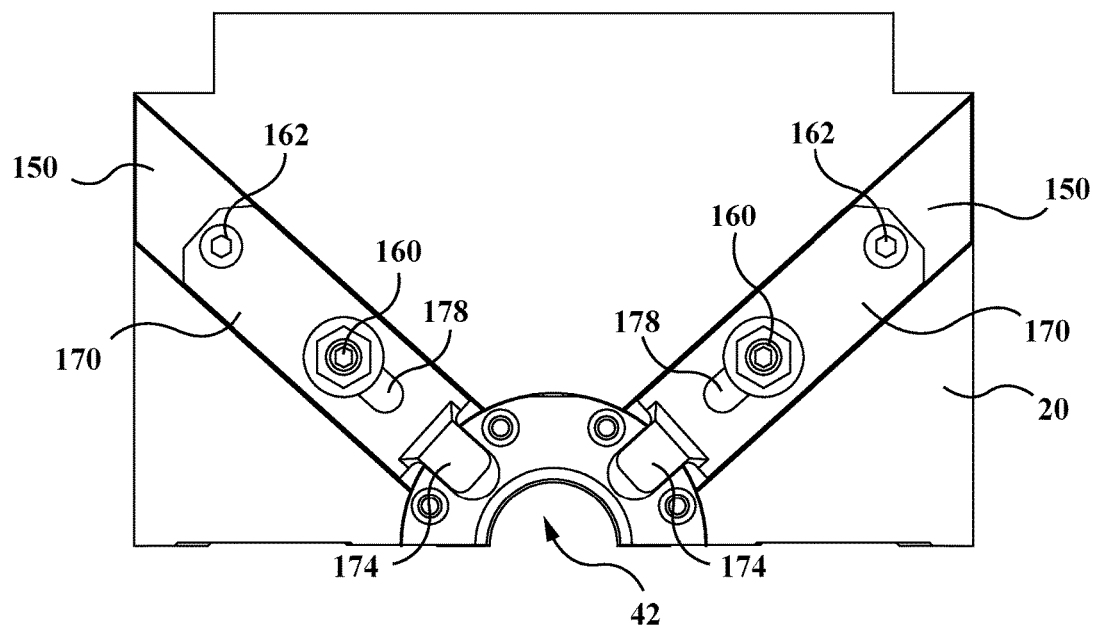
FIGS. 8a and 8b illustrate top and side schematic views of a clamp mechanism in accordance with another embodiment.
Figure 8B:
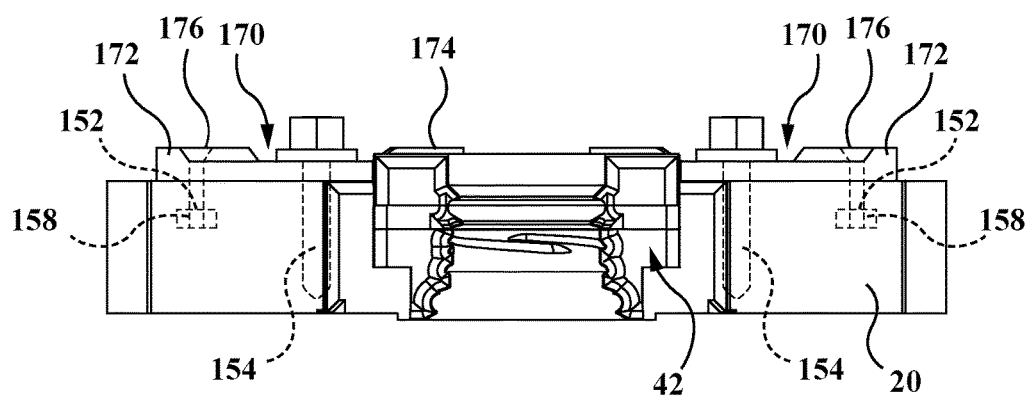
Figure 9A:
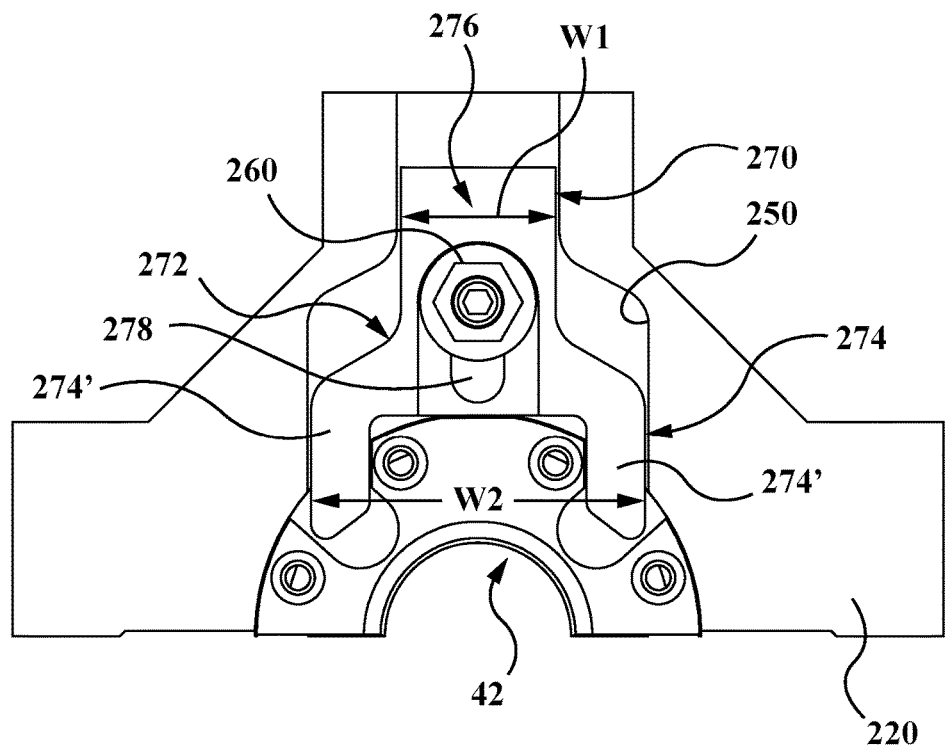
FIGS. 9a and 9b illustrate top and side schematic views of a clamp mechanism in accordance with another embodiment.
Figure 9B:
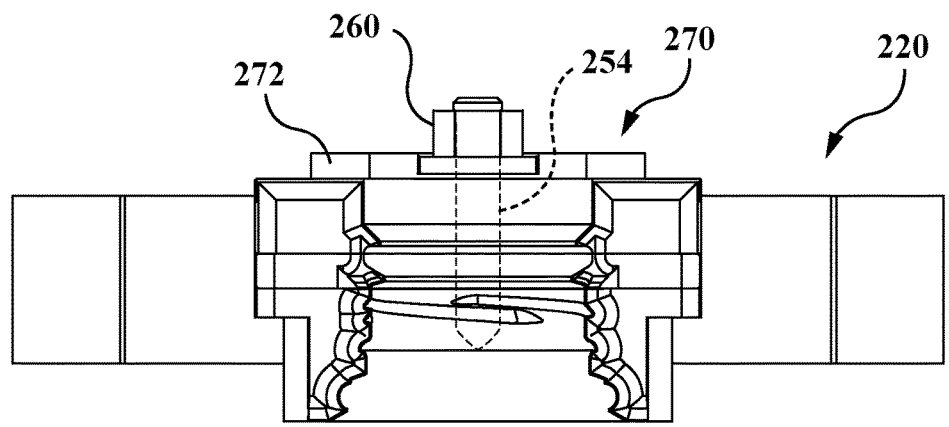

Manually operable retention devices or clamp mechanisms 170 in accordance with another embodiment hereof are illustrated in FIGS. 8a and 8b, and a manually operable retention device or clamp mechanism 270 in accordance with another embodiment hereof is illustrated in FIGS. 9a and 9b. In various embodiments, the clamp mechanisms 170 may be used with various mold assemblies for molding gallon containers but are not so limited. In various embodiments, the clamp mechanism 270 may be used with various mold assemblies for molding half-gallon containers but is not so limited. The clamp mechanisms 170 and 270 are constructed to be utilized without the use of tools, as similarly described with reference to clamp mechanisms 70, 71, 72, and 73, and are configured to be secured within respective keyways 150, 250 of a neck insert block, such as neck insert block 20 of FIGS. 2, 4, 8a and 8b, or a neck insert block 220 of FIGS. 9a and 9b, respectively.

In an embodiment, clamp mechanisms 170 may be used with the mold assembly 10 of FIG. 2 in place of clamp mechanisms 70, 71, 72 and 73. FIGS. 8a and 8b are schematic top and cross-sectional views of clamp mechanisms 170 secured within respective keyways 150 of the neck insert block 20 with the neck insert mold component 42 disposed therein. The clamp mechanisms 170 remain fixed to the neck insert block 20, and thereby to a respective mating mold component, when the neck insert mold component 42 is removed from or installed in the mold assembly. In other words, the clamp mechanisms 170 are usable with a variety of neck insert mold components that may be selected for use with the mold assembly. The neck insert mold component 42 is held in place by clamp mechanisms 170, which are operable between a closed (clamping) position and an open (release) position by being manually translated or slid forward and rearward relative to the mold cavity to enable the neck insert mold component 42 to be secured to and removed from the neck insert block 20.

The neck insert block 20, forming the top level of the mold assembly 10, provides a surface on which the neck insert mold component 42 and clamp mechanism 170 are both secured. The neck insert block 20 includes a pair of angled keyways 150 recessed into an upper surface of the neck insert block 20, within which the clamp mechanisms 170 are disposed and secured, and within which the clamp mechanisms 170 may be manually adjusted between clamping and release positions relative to the neck insert mold component 42. Each keyway 150 includes threaded bores 152 and 154 that extend into the neck insert block 20 and are configured to receive a respective threaded fastener 160 and 162 for securing the clamp mechanism 170 in place. The bore 152 is positioned at a rearward end of the keyway 150 and includes a standoff 158 therein. The bore 154 is positioned within the keyway 150 forward of the bore 152.

Each of the clamp mechanisms 170 of FIGS. 8a and 8b has a clamp body 172 having an elongate construction with a forwardly-extending clamp arm 174 that forms a forward end of the clamp mechanism. The clamp body 172 has a width that substantially matches a width of the keyway 150 and a thickness that is slightly greater than a depth of the keyway 150, and is configured to be slidable within the keyway 150 when the clamp mechanism 170 is not secured in one of a clamping or release position, as explained below. Stated another way, the clamp mechanism 170 is dimensioned to be slidingly translatable within the keyway 150 when unsecured.

When the clamp mechanism 170 is in the closed (clamping) position, the arm 174 engages with the neck insert mold component 42 to secure the component in place on the neck insert block 20 during blow molding. The clamp body 172 has an aperture 176 at a rearward end thereof and an elongate cutout 178 along a mid-section thereof. The aperture 176 is sized for receiving the threaded fastener 162 there through. The aperture 176 and elongate cutout 178 of the clamp mechanism 170 are each aligned with the bores 152 and 154 of the keyway 150, enabling the threaded fasteners 160 and 162 to extend into and engage with the neck insert block 20 to secure the clamp mechanism in one of the clamping and release position relative thereto. In an embodiment, the threaded fastener 160 may be a set screw 160 within the elongate cutout 178 that can be manually tightened, bringing the set screw 160 into locking contact with the clamp body 172 or manually loosened, enabling the clamp mechanism 170 to translate along the keyway 150 a distance permitted by the elongate cutout 178 and set screw 160. When the clamp mechanism 170 is secured to the insert block 20 in a forward (clamping) position, the arm 174 of the clamp mechanism 170 is aligned over or overlaps with the neck insert mold component 42 and the clamp mechanism so positioned is effective to securely hold the neck insert mold component 42 in place during the blow molding process. Further, the threaded fastener 162, which in embodiments hereof may be a cap screw, is secured within or against the standoff 158 in order to tilt the clamp mechanism 170 forward slightly to increase clamping pressure at the arm 174. Stated another way, when the clamp mechanism 170 is in the forward (clamping) position shown in FIG. 8a, the standoff 158 holds-up or supports a rearward end of the clamp body 172 to put pressure on the arm 174 of the clamp mechanism 170.

In an embodiment, a clamp mechanism 270 as shown in FIGS. 9a and 9b may be used with the mold assembly 10 of FIG. 2 in place of clamp mechanisms 70, 71, 72, and 73. FIGS. 9a and 9b are schematic top and cross-sectional views of clamp mechanism 270 secured within a keyway 250 of a neck insert block 220 with a neck insert mold component 42 disposed therein. The clamp mechanism 270 remains fixed to the neck insert block 220, and thereby to the mating mold component, when the neck insert mold component 42 is removed from or installed in the mold assembly. In other words, the clamp mechanism 270 is usable with a variety of neck insert mold components that may be selected for use with the mold assembly.

The neck insert block 220, forming a top level of a mold assembly, provides a surface on which the neck insert mold component 42 and clamp mechanism 270 are both secured. The neck insert block 220 includes keyway 250 recessed into an upper surface of the neck insert block 220 and within which the clamp mechanism 270 may be manually translated between clamping and release positions relative to the neck insert mold component 42. The keyway 250 is a recess that is sized and shaped for accommodating a size and shape of the clamp mechanism 270 and includes a threaded bore 254 disposed therein. The threaded bore 254 extends into the neck insert mold block 220 and is configured to receive a respective threaded fastener 260 for selectively securing the clamp mechanism 270 in place in the keyway 250.

In the embodiment shown in FIGS. 9a and 9b, the clamp mechanism 270 has a clamp body 272 that is generally Y-shaped. The Y-shaped claim body 272 includes a base 276, which forms a rearward portion of the clamp mechanism 270, and a forward portion 274 that includes a pair of forwardly-extending, spaced apart arms 274'. The base 276 of the clamp body 272 has a width that substantially matches a first width W1 of the keyway 250 and the forward portion 274 has a width that substantially matches a second width W2 of the keyway. As well the clamp mechanism 270 has a thickness that is slightly greater than a depth of the keyway 250, and is configured to be slidable within the keyway 250 when the clamp mechanism 270 is not secured in one of a clamping and release position, as explained below. Simply, the clamp mechanism 270 is dimensioned to be slidingly translatable within the keyway 250 when unsecured within the keyway 250.

The clamp body 272 has an elongate cutout 278. The elongate cutout 278 is sized for receiving a threaded fastener 260 therethrough. The elongate cutout 278 of the clamp mechanism 270 is aligned with the threaded bore 254, enabling the threaded fastener 260 to extend into and engage with the neck insert block 220 to secure the clamp mechanism 270 in one of the clamping and release position relative thereto. In an embodiment, the threaded fastener 260 can be a set screw 260 within the elongate cutout 278 that can be manually tightened, bringing the set screw 260 into locking contact with the clamp body 272 or manually loosened, enabling the clamp mechanism 270 to translate along the keyway 250 at distances permitted by the length of the elongate cutout 278 and set screw 260. When the clamp mechanism 270 is in the closed (clamping) position, the forwardly-extending arms 274' engage with the neck insert mold component 42 to secure the neck insert mold component 42 in place on the neck insert block 220 during blow molding. Stated another way, when the clamp mechanism 270 is secured in a forward (clamping) position, the arms 274 of the clamp 270 are aligned over the neck insert mold component 42, maintaining the neck insert mold component 42 in place during the blow molding process.

What is claimed is:

1. A blow mold assembly having opposed mating mold components that form a mold cavity there between, each mating mold component comprising:
   a removable neck insert mold component;
   a clamp mechanism for retaining the neck insert mold component on the mating mold component during a blow-molding process; and
   a neck insert block attached to the mating mold component,
   wherein the clamp mechanism is forwardly translatable relative to the mold cavity to a clamping position and rearwardly translatable relative to the mold cavity to a release position,
   wherein the clamp mechanism remains fixed to the mating mold component when the neck insert mold component is removed from or installed in the mold assembly, and wherein the removable neck insert mold component is retained in the neck insert block by the clamp mechanism when the clamp mechanism is in the clamping position.

2. The blow mold assembly of claim 1, wherein the clamp mechanism has a forwardly-extending arm that engages with the removable neck insert mold component when the clamp mechanism is in the clamping position.

3. The blow mold assembly of claim 1, wherein the clamp mechanism is forwardly and rearwardly translatable within a keyway of the neck insert block.

4. The blow mold assembly of claim 3, wherein the clamp mechanism has an elongate cutout and the keyway has a bore aligned with the elongate cutout, and
wherein a length of the elongate cutout aligned with the bore determines forward and rearward translation distances of the clamp mechanism along the keyway when a fastener is inserted through the elongate cutout and within the bore to secure the clamp mechanism to the neck insert block.

5. The blow mold assembly of claim 3, wherein the clamp mechanism is a pair of clamp mechanisms and wherein the neck insert block comprises a pair of keyways such that each clamp mechanism is forwardly and rearwardly translatable within a respective keyway of the pair of keyways.

6. The blow mold assembly of claim 3, wherein the keyway comprises a pair of angled keyways recessed within the neck insert block with each keyway of the pair of angled keyways having a respective clamp mechanism securable therein.

7. The blow mold assembly according to claim 2, wherein the forwardly-extending arm is a pair of forwardly-extending arms.

8. A blow mold assembly having a neck insert block, each neck insert block comprising:
a keyway recessed within the neck insert block;
a neck insert mold component removably coupled to the neck insert block and disposed forward of the keyway; and
a clamp mechanism securable within the keyway,
wherein the clamp mechanism is forwardly translatable relative to the keyway to a clamping position for retaining the neck insert mold component on the neck insert block during a blow-molding process and is rearwardly translatable relative to the keyway to a release position to permit removal of the neck insert mold component.

9. The blow mold assembly of claim 8, wherein the clamp mechanism has a clamp body with a forwardly-extending arm and an elongate cutout rearward of the forwardly-extending arm, and
wherein when the clamp mechanism is in the clamping position the forwardly-extending arm is in a position for retaining the neck insert mold component on the neck insert block by engaging the neck insert mold component, and when the clamp mechanism is in the release position the forwardly-extending arm is clear of the neck insert mold component.

10. The blow mold assembly of claim 9, wherein the keyway includes a bore that is aligned with the elongate cutout of the clamp body, and
wherein a fastener inserted into the elongate cutout and the bore retains the clamp mechanism within the keyway.

11. The blow mold assembly of claim 10, wherein a length of the elongate cutout determines forward and rearward translation distances of the clamp mechanism within the keyway when the fastener is inserted through the elongate cutout and the bore of the keyway.

12. The blow mold assembly according to claim 9, wherein the clamp body has a width that substantially matches a width of the keyway and a thickness that is slightly greater than a depth of the keyway, and
wherein the clamp mechanism is configured to be slidable within the keyway when the clamp mechanism is not secured in one of the clamping position and the release position.

13. The blow mold assembly according to claim 8, wherein the clamp mechanism is a pair of clamp mechanisms and wherein the neck insert block comprises a pair of keyways such that each clamp mechanism is forwardly and rearwardly translatable within a respective keyway of the pair of keyways.

14. The blow mold assembly according to claim 13, wherein the keyway comprises a pair of angled keyways recessed within the neck insert block with each keyway of the pair of angled keyways having a respective clamp mechanism securable therein.

15. The blow mold assembly according to claim 9, wherein the forwardly-extending arm is a pair of forwardly-extending arms.

* * * * *